(12) United States Patent
Pointon et al.

(10) Patent No.: US 10,746,102 B2
(45) Date of Patent: Aug. 18, 2020

(54) GAS TURBINE ENGINE AND CORE CASING ARRANGEMENT

(71) Applicant: ROLLS-ROYCE plc, London (GB)

(72) Inventors: James M. Pointon, Bristol (GB); Stephen J. Bradbrook, Clevedon (GB)

(73) Assignee: ROLLS-ROYCE plc, London (GB)

( * ) Notice: Subject to any disclaimer, the term of this patent is extended or adjusted under 35 U.S.C. 154(b) by 187 days.

(21) Appl. No.: 15/923,183

(22) Filed: Mar. 16, 2018

(65) Prior Publication Data
US 2018/0283282 A1  Oct. 4, 2018

(30) Foreign Application Priority Data

Mar. 16, 2017 (GB) .................................. 1704173.2

(51) Int. Cl.
*F02C 7/36* (2006.01)
*F01D 25/24* (2006.01)
(Continued)

(52) U.S. Cl.
CPC ................ *F02C 7/36* (2013.01); *F01D 25/24* (2013.01); *F02C 9/18* (2013.01); *F02K 3/06* (2013.01);
(Continued)

(58) Field of Classification Search
CPC ...... F02C 7/36; F02C 7/32; F02K 3/06; F01D 25/24
See application file for complete search history.

(56) References Cited

U.S. PATENT DOCUMENTS

| 4,827,712 A * | 5/1989 | Coplin ...................... F02K 3/06 415/210.1 |
| 2013/0011266 A1 * | 1/2013 | Gallagher ............... F01D 15/12 416/223 A |

(Continued)

FOREIGN PATENT DOCUMENTS

| GB | 1554921 | 10/1979 |
| GB | 2435076 | 8/2007 |

OTHER PUBLICATIONS

Gray, D.E. "Energy Efficient Engine Program Technology Benefit/Cost Study vol. II" 1983. (Year: 1983).*
(Continued)

*Primary Examiner* — Steven M Sutherland
(74) *Attorney, Agent, or Firm* — Oliff PLC

(57) ABSTRACT

A gas turbine engine (10) includes: a compressor system comprising a low pressure compressor (15) and a high pressure compressor (16) coupled to low pressure and high pressure shafts, respectively (23, 24); an inner core casing (34) provided radially inwardly of compressor blades (42), and an outer core casing provided outwardly of compressor blades, the inner core casing and outer core casing defining a core working gas flow path (B) therebetween; a fan (13) coupled to the low pressure shaft via a gearbox (14); wherein the outer core casing comprises a first outer core casing (48) and a second outer core casing (50) spaced radially outwardly from the first outer core casing, and wherein at an axial plane (E) of an inlet to the high pressure compressor, the second outer core casing has an inner radius at least 1.4 times the inner radius of the first outer core casing.

13 Claims, 3 Drawing Sheets

(51) Int. Cl.
*F02K 3/06* (2006.01)
*F02C 9/18* (2006.01)

(52) U.S. Cl.
CPC ............... *F05D 2220/323* (2013.01); *F05D 2220/3216* (2013.01); *F05D 2240/60* (2013.01); *Y02T 50/671* (2013.01)

(56) References Cited

U.S. PATENT DOCUMENTS

2013/0104560 A1    5/2013  Kupratis
2015/0369127 A1*  12/2015  Gilson .................... F01D 25/24
                                                             415/119

OTHER PUBLICATIONS

Great Britain Search Report dated Sep. 11, 2017 issued in GB Patent Application No. 1704173.2.

* cited by examiner

GAS TURBINE ENGINE AND CORE CASING ARRANGEMENT

CROSS-REFERENCE TO RELATED APPLICATION

This application is based upon, and claims the benefit of priority from UK Patent Application No. 1704173.2, filed on 16 Mar. 2017, the entire contents of which are hereby incorporated by reference.

BACKGROUND

Field

The present disclosure concerns a geared aircraft gas turbine engine.

Description of Related Art

Aircraft gas turbine engines typically comprise a gas turbine engine core and a core driven fan enclosed within a fan nacelle. Air flows through the fan in use, and is divided into two airflows downstream—a bypass flow and a core flow. The ratio between the mass flow rate of air in the bypass flow to the mass flow rate of airflow of the core flow is known as the bypass ratio. At subsonic flight velocities, a large bypass ratio is desirable for high efficiency.

Gas turbine engine efficiency can also be increased by increasing the Overall Pressure Ratio (OPR). High OPR results in high thermodynamic efficiency, and so low fuel burn. A high OPR can be achieved by increasing the number of compressor stages.

However, high OPR engine cores (having a large number of compressor stages) and/or high bypass ratios can result in relatively long, thin engine cores. Such cores can be susceptible to flexing in flight, which can result in rotor blade tip rubs (potentially resulting in damage) and/or excessive blade tip clearances being required (resulting in an adverse impact on efficiency). Increasing the engine core stiffness by using additional bracing can result in engine weight penalties, which again detracts from the overall aircraft level reduction in fuel consumption provided by high bypass ratios and/or high OPR.

The present invention seeks to provide an aircraft gas turbine engine that seeks to ameliorate or overcome some, or all, of these issues.

BRIEF SUMMARY OF THE INVENTION

According to a first aspect of the invention there is provided an aircraft gas turbine engine comprising: a compressor system comprising a low pressure compressor coupled to a low pressure shaft, and a high pressure compressor coupled to a high pressure shaft; an inner core casing provided radially inwardly of compressor blades of the compressor system; an outer core casing arrangement provided radially outwardly of compressor blades of the compressor system, the inner core casing and outer core casing arrangement defining a core working gas flow path therebetween; a fan coupled to the low pressure shaft via a reduction gearbox; the outer core casing arrangement comprising a first outer core casing and a second outer core casing spaced radially outwardly from the first outer core casing; wherein, at an axial plane of an inlet to the high pressure compressor, the second outer core casing has an inner radius at least 1.4 times the inner radius of the first outer core casing.

Accordingly, the structural load bearing second outer core case has a relatively straight profile through the compressor system, in spite of the relatively serpentine core working gas flow path through the low and high pressure compressors. This arrangement thereby provides a relatively stiff and structurally efficient structure, which in turn reduces bending for a given structural weight. In view of the stiff core structure, engine flexing is reduced in flight, thereby permitting reduced core rotor tip clearances, and improved reduction gearbox shaft and gear teeth alignment.

The core compressors and fan may be configured to provide an overall pressure ratio in use of between 40 and 80.

The low pressure compressor may be configured to provide a pressure ratio in use of between 2 and 4.

The high pressure compressor may be configured to provide a pressure ratio in use of between 10 and 30.

The fan may be configured to provide a fan pressure ratio of between 1.3 and 1.5.

The fan and compressors may define a bypass ratio between 13 and 25.

The second outer core casing may have an inner diameter at the axial plane of an inlet to the high pressure compressor greater than or substantially equal to a mid-height diameter of a final stage stator of the low pressure compressor.

The low pressure compressor may comprise a multi-stage axial compressor having between two and four stages.

The high pressure compressor may comprise between 8 and 12 stages, and may comprise 10 stages.

The engine may comprise a high pressure turbine coupled to the high pressure compressor by a high pressure shaft. The engine may comprise a low pressure turbine coupled to the low pressure compressor by a low pressure shaft.

The reduction gearbox may be provided between the fan and the low pressure compressor. The reduction gearbox may comprise an epicyclic gearbox, and may comprise a planetary gearbox.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION OF THE DRAWINGS

Embodiments will now be described by way of example only, with reference to the Figures, in which.

DETAILED DESCRIPTION

Figure 1:
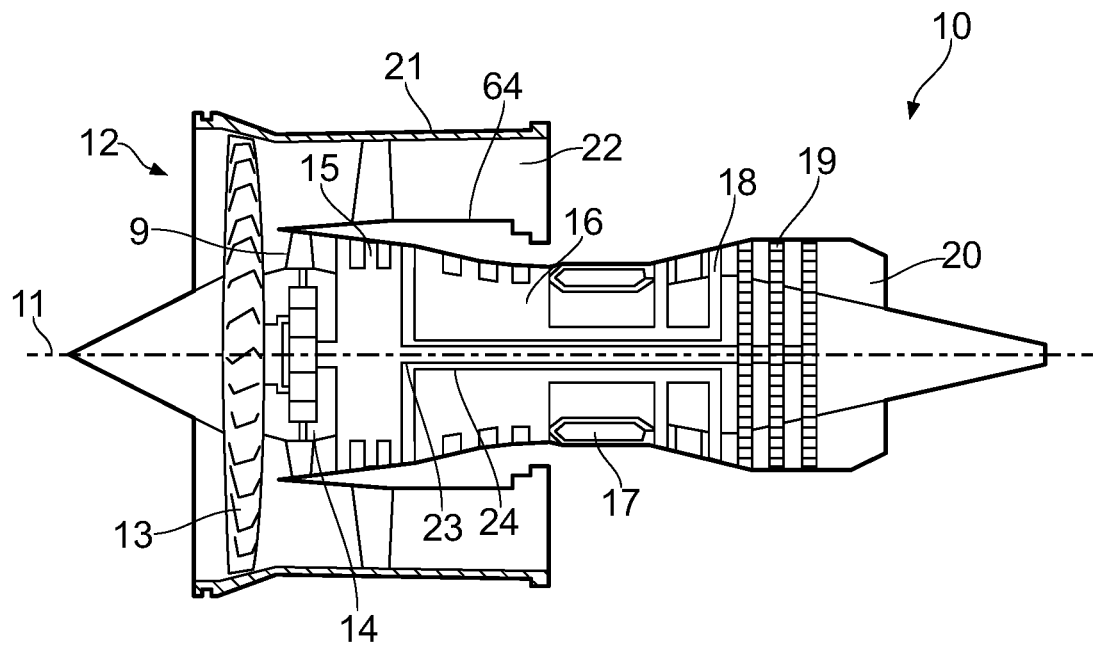
FIG. 1 is a sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 13, a low pressure compressor 15, a high pressure compressor 16, combustion equipment 17, a high pressure turbine 18, a low pressure turbine 19 and a core exhaust nozzle 20. A nacelle 21 generally surrounds the engine 10 and defines the intake 12. A bypass passage inner casing 64 is also provided, which is spaced radially inwardly from the nacelle 21, and defines a bypass passage therebetween.

The gas turbine engine 10 works in the conventional manner so that air entering the intake 12 is accelerated by the fan 13 to produce two air flow paths: a first air flow path A into the core 9 of the engine, the low pressure compressor 15, the high pressure compressor 16 and downstream components, as a core flow; and a second air flow path B which passes through a bypass duct 22 to provide propulsive thrust as a bypass flow. A ratio of mass flows A:B defines a bypass ratio (BPR).The relative core and bypass mass flows may vary slightly in use, depending on aircraft velocity, altitude, engine power setting etc. In the described embodiment, the bypass ratio is 15 at mid-cruise (i.e. with the engine at a cruise throttle setting, at an altitude of between 30,000 and 40,000 feet, at a Mach number of approximately 0.85 and the fan 13 has a fan pressure ratio of approximately 1.4 at this condition. Such a high bypass ratio results in a low specific thrust (i.e. maximum engine thrust in pounds force divided by total intake airflow rate in pounds per second) of between 7 and 10, and more typically around 8 to 9. Typically, the fan tip loading (i.e. the delta enthalpy in the bypass stream across the fan rotor divided by the fan entry tip rotational velocity squared) is between 0.28 and 0.35, and is more typically between 0.3 and 0.33. The low pressure compressor 15 compresses the air flow directed into it before delivering that air to the high pressure compressor 16 where further compression takes place.

The compressed air exhausted from the high pressure compressor 16 is directed into the combustion equipment 17 where it is mixed with fuel and the mixture combusted. The resultant hot combustion products then expand through, and thereby drive, the high and low pressure turbines 18, 19 before being exhausted through the nozzle 20 to provide additional propulsive thrust. The total thrust provided by both flows A, B is typically in the range of 35,000 to 130,000 pounds force. The high pressure turbine 18 drives the high pressure compressor 16 by an interconnecting shaft, high pressure shaft 24. The low pressure turbine 19 drives the low pressure compressor 15 and fan 13 by an interconnecting shaft, low pressure shaft 23. An epicyclic gearbox 14 is coupled between the low pressure shaft 23 and the fan 13 so that the fan 13 rotates more slowly than the low pressure turbine 19 which drives it. The low pressure compressor 15 may be on either side of the epicyclic gearbox 14. If it is on the same side as the fan 13 it may be referred to as a booster compressor.

Figure 2:
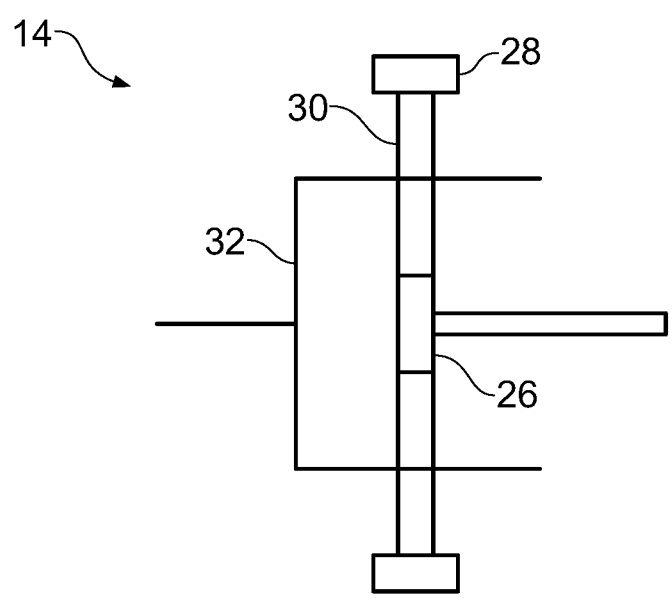
FIG. 2 is a sectional side view of a reduction gearbox of the gas turbine engine of FIG. 1.

The epicyclic gearbox 14 is shown in FIG. 2. It comprises an externally toothed sun gear 26 and an internally toothed ring gear 28 which is concentric with the sun gear 26. An array of externally toothed planet gears 30, five as illustrated, are provided radially between the sun gear 26 and the ring gear 28. The teeth of the planet gears 30 intermesh with the teeth of the sun gear 26 and the ring gear 28. The planet gears 30 are held in fixed relationship to each other by a planet carrier 32. Each planet gear 30 is mounted to the planet carrier 32 by a bearing so that it is free to rotate about its own axis but cannot move relative to the planet carrier 32.

The epicyclic gearbox 14 is arranged in planetary configuration. Thus the drive input from the low pressure turbine 19 is received into the sun gear 26 and the drive output to the fan 13 is delivered from the planet carrier 32. The ring gear 28 is held stationary, not rotating. Thus when drive is delivered to the sun gear 26 the interaction of the teeth causes the planet gears 30 to rotate about their own axes and to precess (orbit) around the inside of the ring gear 28. The movement of the planet gears 30 around the ring gear 28 causes the planet carrier 32 to rotate. In this embodiment, the gearbox has a reduction ratio of approximately 3.5:1.

Figure 3:
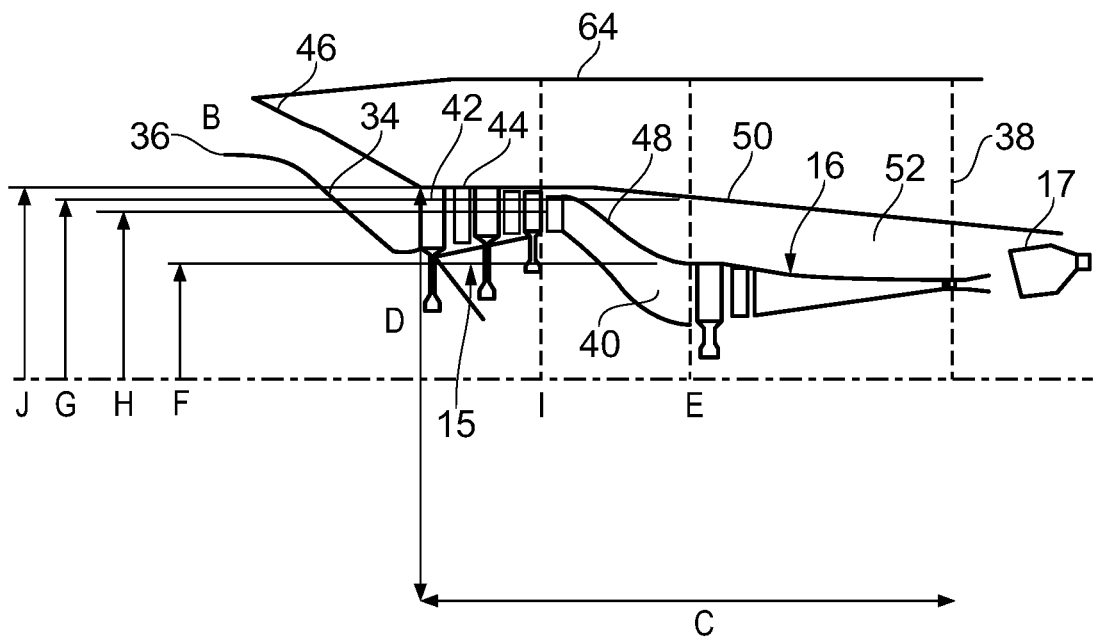
FIG. 3 is a sectional side view of a compressor section of the engine of FIG. 1.

The low pressure compressor 15 and high pressure compressor 16 form a compressor section of the engine 10, which is shown in more detail in FIG. 3. Each compressor 15, 16 of the compressor section comprises a respective multi-stage axial compressor, each stage comprising a respective compressor rotor 42 and stator 44. Each rotor 42 and stator 44 in turn comprises a plurality of blades. The low pressure compressor 15 comprises three compressor stages and provides a pressure ratio of approximately 3:1, whilst the high pressure compressor 16 comprises 10 compressor stages and provides a pressure ratio of approximately 15:1. Consequently, a high overall pressure ratio (OPR) of approximately 60:1 is provided by the large number of axial compressor stages and the fan. The OPR is defined by the ratio between the divided by the pressure at the compressor outlet (i.e. immediately upstream of the combustor) divided by the inlet pressure at the engine inlet (i.e. upstream of the fan). The geared fan architecture enables a high OPR with a relatively small diameter low pressure ratio low pressure compressor 15, and/or with a relatively small number of stages. This is because the low pressure compressor 15 rotational speed is decoupled from the fan 13 rotational speed (in view of the reduction gearbox 14), and so the low pressure compressor 15 can rotate at a relatively high speed, whilst the fan 13 rotates at a relatively low speed. This results in high tip speed for the low pressure compressor 15 rotor 42 for a given rotor diameter, and so a higher pressure ratio in comparison to a direct drive, two shaft gas turbine engine. Alternatively, the rotor tip diameter can be reduced for a given pressure ratio.

As a result of this combination of high OPR, high number of compressor stages, and relatively small compressor rotor tip diameter, a core compressor rotor having a high aspect ratio (i.e. a high ratio of compressor section length C to compressor rotor maximum diameter D) may result. In the present embodiment the compressor section aspect ratio is approximately 1.3, and may in general be between 1.2 and 1.5, or even higher. In view of this high aspect ratio core, the compressors 15, 16 may be susceptible to flexing in flight, which may result in reduced tip clearances, and so rotor tip damage. One solution to this problem would be to increase the rotor tip clearances, but this would reduce compressor efficiency. Alternatively, the compressor casing could be stiffened using additional material, but this would result in increased weight. The present disclosure on the other hand solves this problem as outlined below.

The compressor section comprises a radially inner core wall 34, which is provided radially outwardly of the low and high pressure shafts 23, 24. The radially inner core wall 34 extends in a generally axial direction between a compressor inlet 36 downstream of the fan 13 and upstream of the low pressure compressor 15, to a compressor outlet 38 downstream of the high pressure compressor 16 and upstream of the combustor 17. The radially inner core wall 34 has a curve profile in axial cross-section. In general, the inner core wall 34 curves radially inwardly from the compressor inlet 36 to a front face of the low pressure compressor 15. The inner core wall 34 then extends radially outwardly through the low pressure compressor 15, before curving radially inwardly once more through a diffuser 40 located between the low pressure compressor 15 and high pressure compressor 16.

The inner core wall 34 again extends radially outwardly through the high pressure compressor 16. The increase in radial extent of the radially inner core wall 34 through the compressors 15, 16 enables approximately constant rotor tip diameters and thereby ensures substantially constant compressor tip speed through the compressors 15, 16, whilst allowing for a reduction in cross sectional area through the compressors in a downstream direction. Meanwhile, the radially inward curvature upstream of each compressor 15, 16 is a result of the different rotational speeds of the low pressure and high pressure shafts 23, 24, which results in different tip diameters for the respective compressors 15, 16.

The compressor section further comprises a radially outer core wall 46. The radially outer core wall 46 is provided radially outwardly of the inner core wall 34, and the tips of the compressor rotors 42 and stators 44. An annular spacing between a radially outer surface of the inner core wall 34 and a radially inner surface of the outer core wall 34, 46 defines the core flow path B.

Again, the radially outer core wall 46 extends in a generally axial direction between the compressor inlet 36 downstream of the fan 13 and upstream of the low pressure compressor 14, to a compressor outlet 38 downstream of the high pressure compressor 15 and upstream of the combustor 17. The radially inner core wall 34 has a curved profile in axial cross-section. In general, the outer core wall 46 curves radially inwardly from the compressor inlet 36 to the front face of the low pressure compressor 15.

The radially outer core wall 46 extends generally axially through the low pressure compressor 15, and defines an inner surface of the outer core wall 46 having a generally constant diameter through the low pressure compressor 15. The outer core wall 46 provides containment for the pressurised air within the core flow path B, and also provides structural support for the core.

Downstream of the low pressure compressor 15 and upstream of the high pressure compressor 16, radially outwardly of the diffuser 48, the outer core wall 46 bifurcates into first and second outer core casings 48, 50. In alternative arrangements, separate first and second outer core casings 48, 50 could also extend across the low pressure compressor. The first outer core casing 48 is provided radially inwardly of the second outer core casing 50, and a radially inner surface of the first outer core casing 48 defines the core air flow path B between the low pressure compressor 15 exit and the compressor outlet 38. The functions of the outer core wall 46 are also split at this point—the first outer core casing 48 provides containment of pressurised air within the compressor (and so is wholly annular, and generally air-tight, save for access for bleed ports), whereas the second outer core casing 50 may provide only structural support, and need not be wholly annular or air-tight, though in other embodiments both casings 48, 50 may provide both pressure containment and structural support. The first and/or second outer-core casings 48, 50 may be provided with bracing or support structures, such as ribs.

The first outer core casing 48 extends radially inwardly in a downstream direction through the diffuser 40. A bend in the first outer core casing 48 is provided at the downstream end of the diffuser 40, such that the first outer core casing 48 continues to extend radially inwardly through the high pressure compressor 16, though to a lesser extent.

On the other hand, the second outer core casing 50 is relatively straight, and extends radially inwardly in a downstream direction to a lesser extent than the first outer core casing 48. Consequently, an annular inter-casing gap 52 is defined by a radially outer surface of the first outer core casing 48 and a radially inner surface of the second outer core casing 50. In view of the relatively straight profile and increased diameter of the outer casing 50 relative to the inner core casing 48, the casing 50 is stiffer, and less susceptible to flexing in flight compared to where the second outer core casing 50 more closely follows the first outer core casing 48, or where only a single outer core casing providing both pressure containment and structural support is provided.

As a result of the above described shapes of the inner wall 34 and first and second outer casings 48, 50, various geometric parameters are defined. A leading edge of the first high pressure compressor rotor defines an inlet to the high pressure compressor 16. At an axial plane E of the inlet to the high pressure compressor 16, the first outer core casing 48 defines an inner radius F, while at the same axial plane, the second outer core casing 50 defines an inner radius G. A ratio of the radius G to the radius F is at least 1.4, and in the present embodiment is approximately 1.47. In general, the ratio G:F may be as high as 1.7. Similarly, at the axial plane E, the inner surface of the second core outer casing 50 has a radial extent G greater than a mid-height H of a trailing edge (at axial plane I) of a final (i.e. axially rearmost) rotor blade of the low pressure compressor 15. Similarly, at the axial plane I, the second outer core casing 50 has an inner radius J. A ratio J to F is approximately 3.2, and is generally at least 2.5 and may be up to 4.

In view of these parameters, a small diameter pressure vessel (i.e. the first outer core casing 48) can be provided for the high pressure compressor 16. Consequently, the pressure vessel has high strength and low weight in view of its dimensions (the stresses imposed on the pressure vessel are largely in the form of hoop stresses). On the other hand, the dimensions of the structural support (i.e. the second outer core casing 50) are unconstrained by the dimensions of the first outer core casing 48, and so a larger diameter, straighter (and therefore stronger and stiffer) structural support can be provided.

Figure 4:
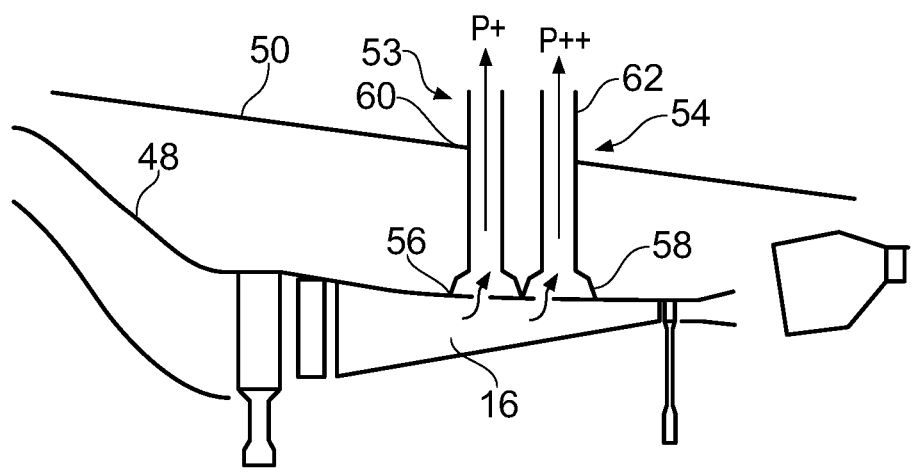
FIG. 4 is a sectional side view of bleed ports forming part of the compressor section of FIG. 3.

Referring to FIG. 4, the compressor section further comprises first and second bleed ports 53, 54, which are each in fluid communication with a respective stage of the high pressure compressor 16. The bleed ports 53, 54 may be either customer bleed ports (configured to supply pressurised air for use in an environmental control system or other pneumatic system), or may comprise handling bleed ports (configured only to relieve compressor pressure, to improve compressor operability). Since each of the ports 53, 54 is in communication with a different stage of the high pressure compressor 16, the pressure within the ports 53, 54 is different, with port 54 having a higher pressure than port 53. In a conventional arrangement, the ports would comprise valves provided in the compressor, with front and rear bulkheads separating the ports from the remaining space within the inter-casing gap 52.

Figure 5:
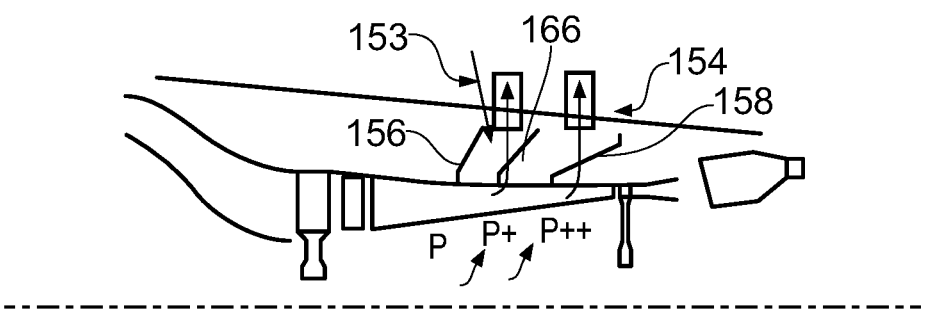
FIG. 5 is a sectional side view of an alternative bleed port arrangement, which is not in accordance with the present invention.

In contrast, FIG. 5 shows a more conventional bleed port arrangement, which is not in accordance with the present invention. An inter-port bulkhead 166 is provided within the space defined by front and rear bulkheads 156, 158 to separate the two ports. However, in view of the large radial extent of the gap 52 in the present invention, the inter-port bulkhead would have a large radial extent. Consequently, the rearward pressure on this bulkhead would cause a bending stress, requiring additional material in the bulkhead to prevent buckling.

Referring once more to FIG. 4, this problem is solved in the present invention by providing a bleed port arrangement in which each port comprises a respective generally hemispherical collecting annulus 56, 58 provided adjacent the first outer casing 48, in fluid communication with a respective compressor stage of the high pressure compressor 16. Each annulus 56, 58 in turn communicates with a respective tube 60, 62 extending between the first outer casing 48 and the second outer casing 50. Consequently, a smaller collecting annulus can be provided, thereby reducing the load on the arrangement. Furthermore, in view of the hemispherical shape of the annulus and cylindrical shape of the tubes, these items are more capable of withstanding the high pressures contained within.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

By way of example such engines may have an alternative number of interconnecting shafts (e.g. three) and/or an alternative number of compressors and/or turbines.

Various parameters of the engine may be modified. For example, in general, the BPR may be between 13 and 25, and the OPR may be between 40 and 80. Consequently, the pressure ratios of the low and high pressure compressors may also vary, typically between 2 and 4:1, and 15 to 20:1 respectively. Similarly, the reduction gearbox may have a reduction ratio of between 3:1 and 5:1.

All references to "pressure" in the above shall be taken to refer to total pressure, unless otherwise stated. It will be understood that the drawings are representative of the general configuration, but are not necessarily to scale.

The invention claimed is:

1. An aircraft gas turbine engine comprising:
   a compressor system comprising a low pressure compressor coupled to a low pressure shaft, and a high pressure compressor coupled to a high pressure shaft;
   an inner core casing provided radially inward of compressor blades of the compressor system;
   a fan coupled to the low pressure shaft via a reduction gearbox; and
   an outer core casing arrangement provided radially outwardly of the compressor blades of the compressor system, the inner core casing and the outer core casing arrangement defining a core working gas flow path therebetween, and defining a diffuser between the low pressure compressor and the high pressure compressor, the outer core casing arrangement bifurcating, at a location between the low pressure compressor and the diffuser, into (i) a first outer core casing, and (ii) a second outer core casing spaced radially outward from the first outer core casing and extending rearward with respect to the aircraft gas turbine engine from the location between the low pressure compressor and the diffuser, the second outer core casing being disposed radially between the first outer core casing and a bypass passage inner casing,
   wherein, at an axial plane of an inlet of the high pressure compressor, the second outer core casing has an inner radius in a range of 1.4 to 1.7 times an inner radius of the first outer core casing.

2. The aircraft gas turbine engine according to claim 1, wherein the compressor system and fan are configured to provide an overall pressure ratio between 40 and 80.

3. The aircraft gas turbine engine according to claim 1, wherein the low pressure compressor is configured to provide a pressure ratio in use of between 2 and 4.

4. The aircraft gas turbine engine according to claim 1, wherein the high pressure compressor is configured to provide a pressure ratio between 10 and 30.

5. The aircraft gas turbine engine according to claim 1, wherein the fan is configured to provide a fan pressure ratio between 1.3 and 1.5.

6. The aircraft gas turbine engine according to claim 1, wherein the fan and the compressor system define a bypass ratio between 13 and 25.

7. The aircraft gas turbine engine according to claim 1, wherein the second outer core casing has an inner diameter at the axial plane of the inlet of the high pressure compressor greater than or equal to a mid-height diameter of a final stage stator of the low pressure compressor.

8. The aircraft gas turbine engine according to claim 1, wherein the low pressure compressor includes a multi-stage axial compressor having two to four stages.

9. The aircraft gas turbine engine according to claim 1, wherein the high pressure compressor has 8 to 12 stages.

10. The aircraft gas turbine engine according to claim 1, further comprising:
    a high pressure turbine coupled to the high pressure compressor by a high pressure shaft; and
    a low pressure turbine coupled to the low pressure compressor by a low pressure shaft.

11. The aircraft gas turbine according to claim 1, wherein the reduction gearbox is disposed between the fan and the low pressure compressor.

12. The aircraft gas turbine engine according to claim 1, wherein the reduction gearbox includes an epicyclic gearbox.

13. The aircraft gas turbine according to claim 12, wherein the reduction gearbox includes a planetary gearbox.

* * * * *